United States Patent
Shao et al.

(10) Patent No.: US 9,689,677 B2
(45) Date of Patent: Jun. 27, 2017

(54) MEMS DEVICE WITH COMMON MODE REJECTION STRUCTURE

(71) Applicant: FREESCALE SEMICONDUCTOR, INC., Austin, TX (US)

(72) Inventors: Peng Shao, Chandler, AZ (US); Andrew C. McNeil, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 67 days.

(21) Appl. No.: 14/744,693

(22) Filed: Jun. 19, 2015

(65) Prior Publication Data

US 2016/0370182 A1 Dec. 22, 2016

(51) Int. Cl.
G01C 19/56 (2012.01)
G01C 19/5747 (2012.01)
G01C 19/574 (2012.01)
G01C 19/5769 (2012.01)

(52) U.S. Cl.
CPC ....... G01C 19/5747 (2013.01); G01C 19/574 (2013.01); G01C 19/5769 (2013.01)

(58) Field of Classification Search
CPC ............ G01C 19/5747; G01C 19/5719; G01C 19/574; G01C 19/5769; G01C 19/5755; G01C 19/5762
USPC .............................. 73/504.12, 504.14, 504.04
See application file for complete search history.

(56) References Cited

U.S. PATENT DOCUMENTS

| | | | |
|---|---|---|---|
| 5,728,936 A | 3/1998 | Lutz | |
| 6,823,733 B2 * | 11/2004 | Ichinose | G01C 19/5719 73/504.14 |
| 8,453,504 B1 | 6/2013 | Mao | |
| 2004/0206176 A1 * | 10/2004 | Willig | G01C 19/5747 73/504.12 |
| 2006/0032309 A1 * | 2/2006 | Caminada | G01C 19/5726 73/514.18 |
| 2010/0186507 A1 * | 7/2010 | Gunthner | G01C 19/574 73/504.14 |
| 2010/0281977 A1 * | 11/2010 | Coronato | G01C 19/5712 73/504.14 |

(Continued)

OTHER PUBLICATIONS

Trinh et al, "Design and Analysis of a Z-axis Tuning Fork Gyroscope with Guided-mechanical Coupling", Microsystem Technologies 20.2, 2014, pp. 281-289, published online: 2013, Springer-Verlag Berlin Heidelberg.

(Continued)

*Primary Examiner* — Helen Kwok
(74) *Attorney, Agent, or Firm* — Charlene R. Jacobsen

(57) ABSTRACT

A MEMS device includes a drive spring system coupling a pair of drive masses and a sense spring system coupling a pair of sense masses. The drive spring system includes a constrained stiff beam and flexures interconnecting the pair of drive masses. In response to drive movement of the drive masses the flexures enable pivotal movement of the constrained stiff beam about its center hinge point to enable anti-phase drive motion of the drive masses and to suppress in-phase motion of the drive masses. The sense spring system includes diagonally oriented stiff beams and a spring system that enable anti-phase sense motion of the sense masses while suppressing in-phase motion of the sense masses. Coupling masses interposed between the drive and sense masses decouple the drive motion of the drive masses from the sense motion of the sense masses.

20 Claims, 6 Drawing Sheets

(56) References Cited

U.S. PATENT DOCUMENTS

| | | | |
|---|---|---|---|
| 2011/0132087 A1* | 6/2011 | Ohms | G01C 19/5747 73/504.12 |
| 2012/0247206 A1 | 10/2012 | Ohms et al. | |
| 2013/0160545 A1 | 6/2013 | Rocchi et al. | |
| 2013/0180332 A1 | 7/2013 | Jia et al. | |
| 2013/0298672 A1* | 11/2013 | Kuhlmann | G01C 19/56 73/504.12 |
| 2014/0230549 A1* | 8/2014 | McNeil | G01C 19/574 73/504.13 |
| 2014/0260615 A1* | 9/2014 | Simon | G01P 15/097 73/514.29 |
| 2014/0373627 A1* | 12/2014 | Pruetz | G01C 19/574 73/504.12 |
| 2015/0316378 A1* | 11/2015 | Kergueris | G01C 19/5747 73/504.12 |
| 2016/0069685 A1* | 3/2016 | Furuhata | G01C 19/574 73/504.12 |
| 2016/0223330 A1* | 8/2016 | Pruetz | G01C 19/574 |

OTHER PUBLICATIONS

Extended European Search Report for Patent Appln. No. 16174745.6 (Nov. 10, 2016) 7 pages.

\* cited by examiner

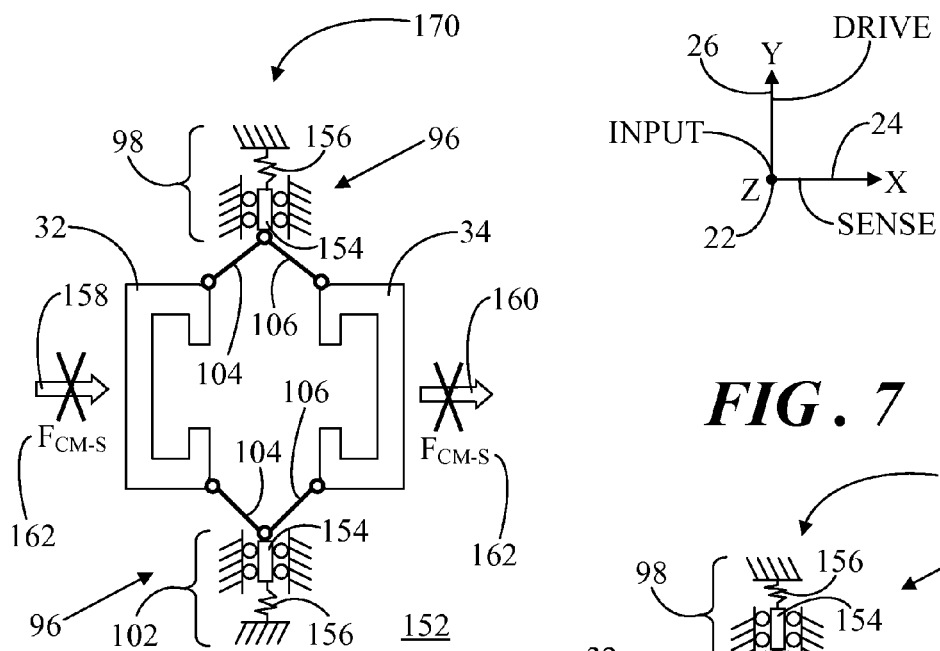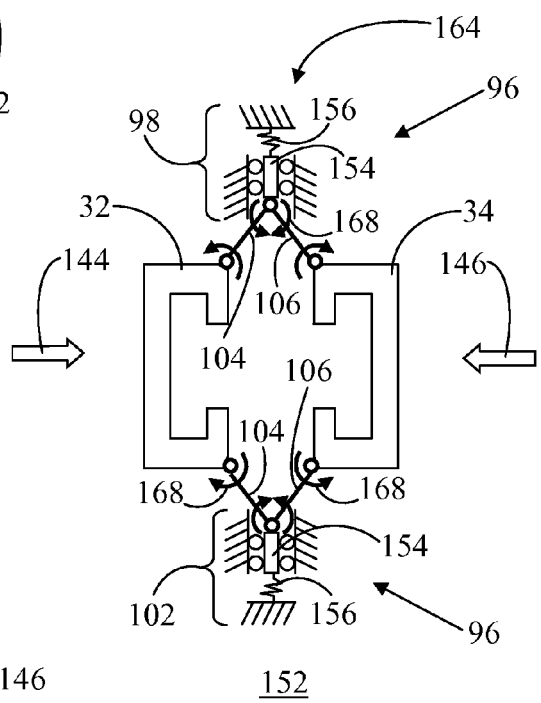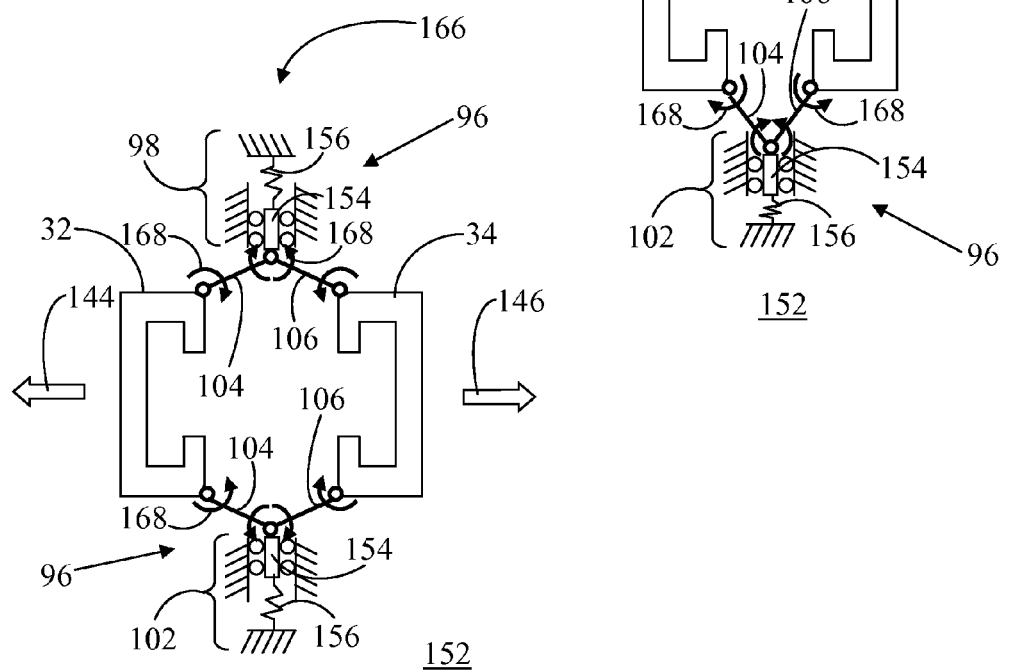

MEMS DEVICE WITH COMMON MODE REJECTION STRUCTURE

TECHNICAL FIELD OF THE INVENTION

The present invention relates generally to microelectromechanical systems (MEMS) devices. More specifically, the present invention relates to a MEMS device, such as an angular rate sensor, that is generally unsusceptible to error resulting from in-phase motion.

BACKGROUND OF THE INVENTION

Microelectromechanical systems (MEMS) technology has achieved wide popularity in recent years, as it provides a way to make very small mechanical structures and integrate these structures with electrical devices on a single substrate using conventional batch semiconductor processing techniques. One common application of MEMS is the design and manufacture of sensor devices. MEMS sensor devices are widely used in applications such as automotive, inertial guidance systems, household appliances, game devices, protection systems for a variety of devices, and many other industrial, scientific, and engineering systems. One example of a MEMS sensor is a MEMS angular rate sensor. An angular rate sensor, also referred to as a gyroscope, senses angular speed or velocity around one or more axes. MEMS gyroscopes are increasingly being adapted for use in the automotive industry to facilitate antiskid control and electronic stability control in anti-rollover systems.

Many MEMS angular rate sensors utilize vibrating structures that are suspended over a substrate. One such angular rate sensor is commonly referred to as a "tuning fork" angular rate sensor and typically has electrostatic drive and capacitive-type sensing. A tuning fork angular rate sensor can include a pair of drive masses and/or a pair of sense masses. The pair of drive masses are driven in phase opposition (i.e., anti-phase). In response to an external angular stimulus about an input axis, the pair of sense masses move in phase opposition by exploiting a Coriolis acceleration component. The movement of the sense masses has an amplitude that is proportional to the angular rotation rate of the angular rate sensor about the input axis.

Unfortunately, such angular rate sensors are susceptible to common mode excitations of both of the drive masses and/or both of the sense masses. Common mode excitation is a condition in which both of the drive masses and/or both of the sense masses move in the same direction and at the same amplitude due to an external stimulus (e.g., shock, vibration, spurious acceleration). The frequency of the in-phase motion (also referred to as common mode frequency) can be as low as or lower than the frequency of the anti-phase motion (also referred to as a differential mode frequency). Thus, common mode excitation (i.e., in-phase motion) can lead to inaccuracy of the angular rate sensor or can result in permanent failure of the angular rate sensor. Moreover, the potential for inaccuracy or failure of the angular rate sensor is exacerbated by the relatively low common mode frequency.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, the Figures are not necessarily drawn to scale, and:

FIG. 6 shows a conceptual model of the pair of sense masses for the MEMS device of FIG. 1 coupled via a spring system in accordance with an embodiment;

FIG. 7 shows the conceptual model of FIG. 6 demonstrating anti-phase motion of the sense masses in a first direction; and FIG. 8 shows the conceptual model of FIG. 6 demonstrating anti-phase motion of the sense masses in a second direction.

DETAILED DESCRIPTION

In overview, embodiments disclosed herein entail a microelectromechanical systems (MEMS) device, such as an angular rate sensor, having a common mode rejection structure and fully decoupled drive and sense modes. In particular, the MEMS device includes a common mode rejection structure in the form of a drive spring system coupling a pair of drive masses. The drive spring system enables a fundamental anti-phase drive motion of the drive masses while increasing the common mode drive frequency so that in-phase motion of the drive masses is effectively rejected. The MEMS device can further include another common mode rejection structure in the form of a sense spring system coupling a pair of sense masses. The sense spring system enables a fundamental anti-phase sense motion of the sense masses while increasing the common mode sense frequency so that in-phase motion of the sense masses is effectively rejected. The MEMS device can additionally include coupling masses interposed between the drive and sense masses to decouple the drive motion of the drive masses from the sense motion of the sense masses. The common mode rejection structures of the MEMS device enable suppression of both of the drive and sense in-phase motion individually, and the fully decoupled configuration reduces the potential for quadrature error and/or other electrical noise that might otherwise impose erroneous signal input from the drive masses to the sense masses. Although a MEMS angular rate sensor is described herein, it should be understood that the drive and sense spring systems may be adapted for use in other MEMS devices implementing dual movable masses that are to move in anti-phase, and for which in-phase motion is to be suppressed.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

Figure 1:
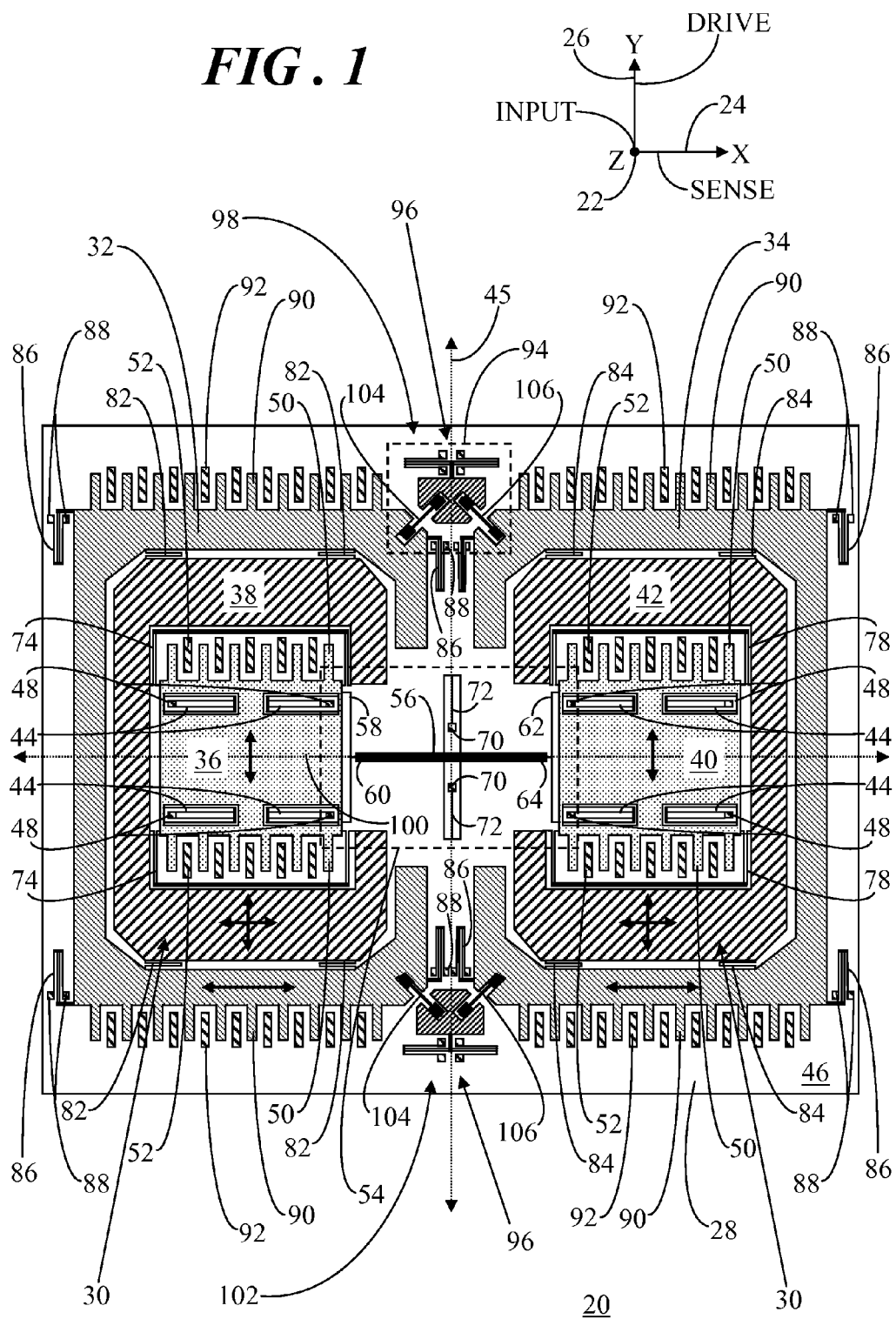
FIG. 1 shows a top view of a MEMS device in accordance with an embodiment.

Referring to FIG. 1, FIG. 1 shows a top view of a MEMS device 20 in accordance with an embodiment. MEMS device 20 is an angular rate sensor that is generally configured to sense angular rate about an axis of rotation referred to as an input axis 22. Accordingly, MEMS device 20 is referred to hereinafter as angular rate sensor 20. In the illustrated configuration, input axis 22 is the Z-axis in a three dimensional coordinate system, where Z-axis 22 extends out of the page, normal to an X-axis 24 and a Y-axis 26 of the coordinate system.

Angular rate sensor 20 includes a planar substrate 28, a drive assembly 30, a first sense mass 32, a second sense mass 34, and various mechanical linkages (discussed herein). Drive assembly 30 includes a first drive mass 36, a first coupling mass 38, a second drive mass 40, and a second coupling mass 42. In the example of FIG. 1, each of first sense mass 32 and first coupling mass 38 is a generally C-shaped frame, with first coupling mass 38 residing in a central opening extending through first sense mass 32 and with first drive mass 36 residing in a central opening extending through first coupling mass 38. Therefore, first coupling mass 38 is positioned between first drive mass 36 and first sense mass 32.

FIG. 1 and subsequent FIGS. 2-8 are illustrated using various shading and/or hatching to distinguish the various elements from one another for clarity of illustration. These different elements within the structural layers may be produced utilizing a wide variety of current and upcoming manufacturing techniques. Furthermore, the use of relational terms, if any, such as first and second, top and bottom, and the like are used herein solely to distinguish one from another entity or action without necessarily requiring or implying any actual such relationship or order between such entities or actions.

Second sense mass 34, second coupling mass 42, and second drive mass 40 are oriented in mirror symmetry about a centerline 45 of angular rate sensor 20 that is substantially parallel to Y-axis 26 relative the corresponding first sense mass 32, first coupling mass 38, and first drive mass 36. Thus, each of second sense mass 34 and second coupling mass 42 is a generally reversed C-shaped frame, with second coupling mass 42 residing in an opening extending through second sense mass 34 and with second drive mass 40 residing in a central opening extending through second coupling mass 42. Therefore, second coupling mass 42 is positioned between second drive mass 40 and second sense mass 34.

In the depicted embodiment, first and second drive masses 36, 40 are configured to undergo in-plane oscillatory linear motion in a drive direction substantially parallel to Y-axis 26. First and second sense masses 32, 34 are configured to undergo in-plane oscillatory linear motion in a sense direction substantially parallel to X-axis 24, and therefore perpendicular to Y-axis 26. As will be discussed in detail below, first and second coupling masses 38, 42 are configured to undergo oscillatory motion in both the drive and sense directions.

Flexible support elements 44 connect each of first and second drive masses 36, 40 to a surface 46 of planar substrate 28 via anchors 48. As such, first and second drive masses 36, 40 are suspended above surface 46 of substrate 28. Flexible support elements 44 enable first and second drive masses 36, 40 to move in a drive direction that is substantially parallel to Y-axis 26. For example, a drive system of angular rate sensor 20 includes sets of drive elements configured to oscillate drive masses 36 and 40. Each set of drive elements includes pairs of electrodes, referred to as movable fingers 50 and fixed fingers 52. In the illustrated example, movable fingers 50 are coupled to and extend from each of drive masses 36, 40 and fixed fingers 52 are fixed to surface 46 of substrate 28. Fixed fingers 52 are spaced apart from and positioned in alternating arrangement with movable fingers 50. By virtue of their attachment to drive masses 36, 40, movable fingers 50 are movable together with drive masses 36, 40. Conversely, due to their fixed attachment to substrate 28, fixed fingers 52 are stationary relative to movable fingers 50.

In general, an alternating current (AC) voltage, as a drive signal, may be applied to a first set of fixed fingers 52 associated with first drive mass 36 and to a second set of fixed fingers 52 associated with second drive mass 40 via a drive circuit (not shown). The two sets of fixed fingers 52 are biased to cause first and second drive masses 36, 40 to oscillate in anti-phase in the drive direction along Y-axis 26 in the three dimensional coordinate system. That is, one drive mass 36 is actuated in the +Y direction while the other drive mass 40 is actuated in the −Y direction, and vice versa.

Figure 2:
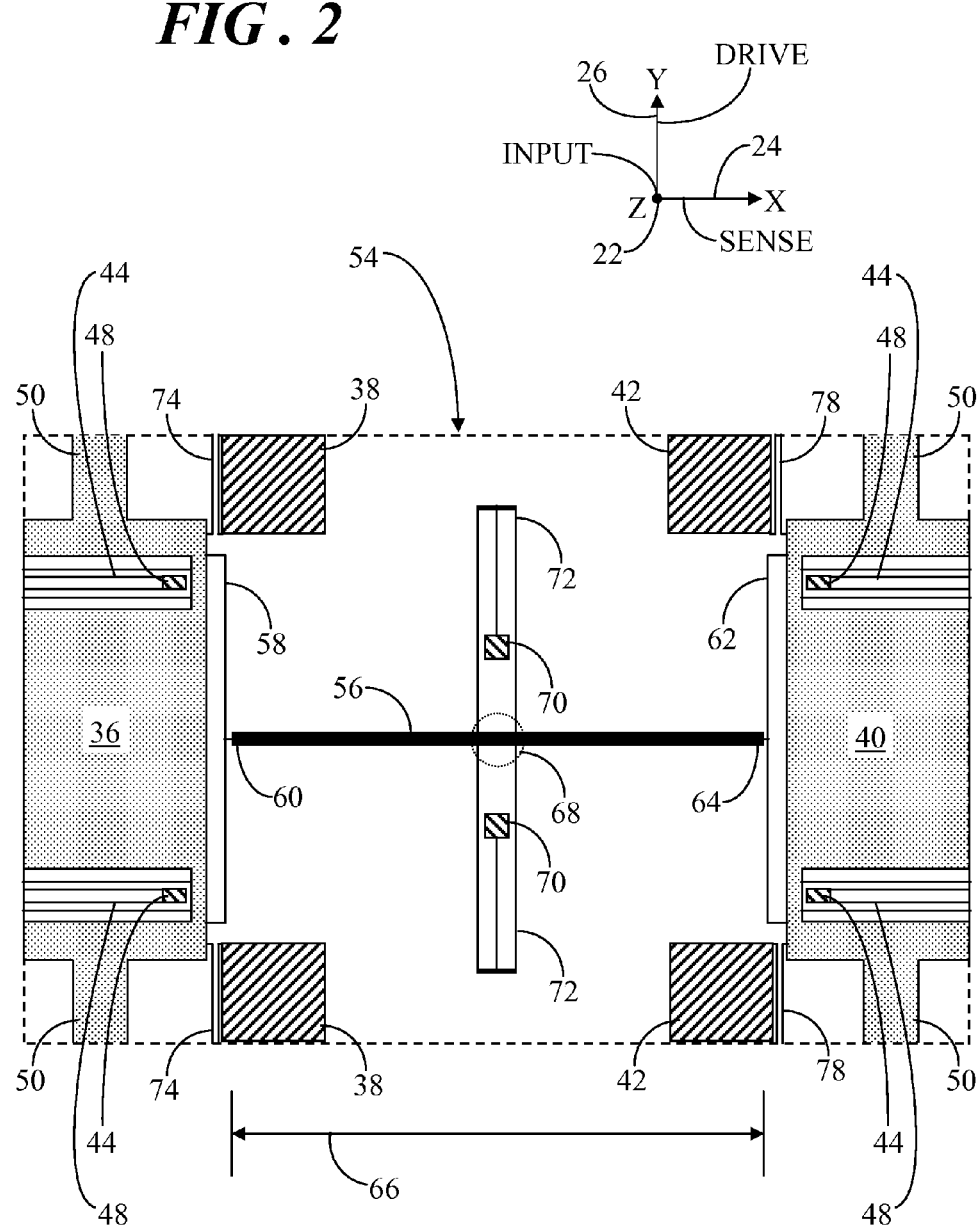
FIG. 2 shows an enlarged partial top view of the MEMS device of FIG. 1.

Referring to FIG. 2 in connection with FIG. 1, FIG. 2 shows an enlarged partial top view of angular rate sensor 20, the partial top view of FIG. 2 being demarcated in FIG. 1 by a dashed line box 54. In accordance with an embodiment, a stiff beam 56 interconnects first drive mass 36 with second drive mass 40. More particularly, a first elastic element 58 is coupled between a first end 60 of stiff beam 56 and first drive mass 36. That is, first end 60 of stiff beam 56 is coupled at a central location of first elastic element 58 and opposing ends of first elastic element 58 are connected to first drive mass 36. Similarly, a second elastic element 62 is coupled between a second end 64 of stiff beam 56 and second drive mass 40. That is, second end 64 of stiff beam 56 is coupled at a central location of second elastic element 62 and opposing ends of second elastic element 62 are connected to second drive mass 40. A lengthwise dimension 66 of stiff beam 56 is oriented generally perpendicular to the drive direction, i.e., Y-axis 26, of first and second drive masses 36, 40, and first and second elastic elements 58 and 62 are oriented transverse to stiff beam 56.

A central region 68 of stiff beam 56 is elastically coupled to planar substrate 28 via at least one anchor element 70 (two shown) and at least one flexure 72 (two shown) interconnected between central region 68 of stiff beam 56 and anchor element 70. Flexures 72 are oriented transverse to stiff beam 56. Thus, central region 68 of stiff beam 56 is hinged to planar substrate 28 via flexures 72 and anchor elements 70. While anchor elements 70 and flexures 72 provide a hinge for rotation, they are configured to be stiff in a direction parallel to Y-axis 72 and are thus resistant to translation in the Y direction.

In operation, the drive system (which includes movable fingers 50 and fixed fingers 52) imparts oscillatory linear motion on first and second drive masses 36 and 40 due to electrostatic force. The movement of first and second drive masses 36 and 40 causes deformation/bending of first and second elastic elements 58, 62 and flexures 72 and pivoting motion of stiff beam 56 about a hinge point/constraint at central region 68 that is substantially perpendicular to planar substrate 28, i.e., Z-axis 22. Thus, the configuration of first and second elastic elements 58, 62 and flexures 72 combined with stiff beam 56 results in a substantially linear oscillation of first and second drive masses 36, 40 in opposite directions (anti-phase) approximately parallel to Y-axis 26 (i.e., up and down in FIGS. 1 and 2).

However, common mode excitation (e.g., shock, vibration, etc), which would typically tend to move first and second drive masses 36, 40 by the same amount and in the same direction along the drive axis, e.g., Y-axis 26, is counteracted by the constraint of stiff beam 56 to substrate 28. Accordingly, common mode excitation (i.e., in-phase motion) of first and second drive masses 36, 40 at the drive frequency is largely rejected due to the coupling of first and second drive masses 36, 40 via stiff beam 56.

During operation of a "tuning fork" type of angular rate sensor, the displacement of the drive masses (e.g., drive masses 36, 40) is typically much larger than the displacement of the sense masses (e.g., sense masses 32, 34). Due to this relatively large displacement, nonlinearity of drive spring motion can cause linearity error. In addition to rejecting common mode excitation, the configuration of stiff beam 56 with first and second elastic elements 58, 62 and flexures 72 yields linear oscillatory behavior of first and second drive masses 36, 40 thereby mitigating the problems associated with nonlinear drive spring motion observed in prior art configurations.

With reference back to FIG. 1, it should be recalled that first coupling mass 38 is interposed between first drive mass 36 and first sense mass 32. Likewise, second coupling mass 42 is interposed between second drive mass 40 and second sense mass 34. First coupling mass 38 is coupled to first drive mass 36 by first link spring components 74 (two illustrated). Similarly, second coupling mass 42 is coupled to second drive mass 40 by second link spring components 78 (two illustrated). In addition, first coupling mass 38 is coupled to first sense mass 32 by first elastic components 82 (four illustrated) and second coupling mass 42 is coupled to second sense mass 34 by second elastic components 84 (four illustrated).

Link spring components 74, 78 are configured to only connect drive masses 36, 40 and coupling masses 38, 42 such that sense masses 32, 34 are substantially decoupled from drive masses 36, 40 with respect to the oscillatory linear motion of drive masses 36, 40 in the drive direction substantially parallel to Y-axis 26. However, elastic components 82, 84 are configured to couple sense masses 32, 34 to any oscillatory linear motion of coupling masses 38, 42 in the sense direction substantially parallel to X-axis 24. By decoupling drive masses 36, 40 and sense masses 32, 34 in this way, quadrature error and other electric noise from drive masses 36, 40 to sense masses 32, 34 can be substantially reduced.

Now with reference to the structure of first and second sense masses 32, 34, flexible support elements 86 connect each of first and second sense masses 32, 34 to surface 46 of planar substrate 28 via anchors 88. As such, first and second sense masses 32, 34 are suspended above surface 46 of substrate 28. Flexible support elements 86 enable first and second sense masses 32, 34 to move in a sense direction that is substantially parallel to X-axis 24.

Angular rate sensor 20 further includes sets of sense elements, where each set of sense elements includes pairs of electrodes, referred to as movable sense fingers 90 and fixed sense fingers 92. In the illustrated example, movable sense fingers 90 are coupled to and extend from each of sense masses 32, 34. Fixed sense fingers 92 are fixed to surface 46 of substrate 28. Fixed sense fingers 92 are spaced apart from and positioned in alternating arrangement with movable sense fingers 90. By virtue of their attachment to sense masses 32, 34, movable sense fingers 90 are movable together with sense masses 32, 34. Conversely, due to their fixed attachment to substrate 28, fixed sense fingers 92 are stationary relative to movable sense fingers 90.

Fixed sense fingers 92 can be single sided or can be arranged in pairs of differential electrodes as known to those skilled in the art. Again, a first set of fixed sense fingers 92 associated with first sense mass 32 are biased in a direction opposing a second set of fixed sense fingers 92 associated with second sense mass 34. As such, fixed sense fingers 92 are configured to response to the anti-phase motion of sense masses 32, 34.

In operation, once first and second drive masses 36, 40 and first and second coupling masses 38, 42 are put into anti-phase oscillatory motion in the drive direction substantially parallel to Y-axis 26, as discussed above, the system of masses is capable of detecting angular rate, i.e., angular velocity, induced by angular rate sensor 20 being rotated about an input axis that is substantially perpendicular to planar substrate 28, i.e., Z-axis 22. In particular, as a result of a Coriolis acceleration component, first and second link spring components 74, 78 and first and second elastic components 82, 84 enable first and second sense masses 32, 34 along with first and second coupling masses 38, 42 to oscillate parallel to surface 46 of planar substrate 28 substantially parallel to the sense axis, i.e., X-axis 24. The anti-phase motion of first and second sense masses 32, 34 has an amplitude that is proportional to the angular rotation rate of angular rate sensor 20 about the input axis, i.e., Z-axis 22, which is sensed as a capacitance change between movable and fixed sense fingers 90, 92.

Figure 3:
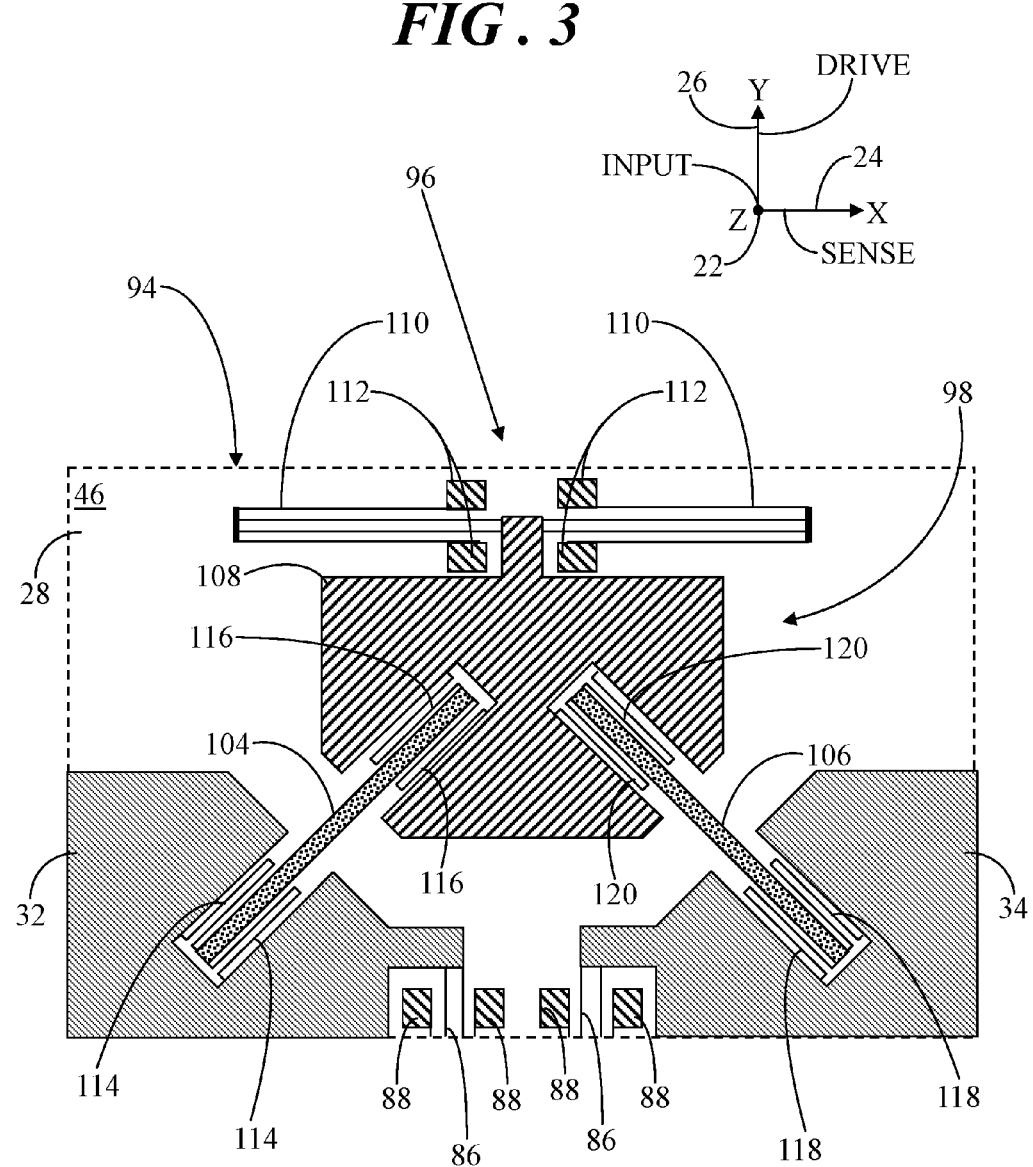
FIG. 3 shows another enlarged partial top view of the MEMS device of FIG. 1.

Referring now to FIGS. 1 and 3, FIG. 3 shows another enlarged partial top view of the angular rate sensor 20, the partial top view of FIG. 3 being demarcated in FIG. 1 by a dashed line box 94. In accordance with an embodiment, angular rate sensor 20 further includes a spring system 96 configured to reduce common mode excitation (i.e., in-phase motion) of first and second sense masses 32, 34.

Spring system 96 includes a first spring arrangement 98 coupled to each of first and second sense masses 32, 34 at a location that is laterally displaced away from a centerline 100 of angular rate sensor 20, where centerline 100 is substantially parallel to X-axis 24 in this embodiment. Spring system 96 further includes a second spring arrangement 102 coupled to each of first and second sense masses 32, 34 at a location that is laterally displaced away from an opposing side of centerline 100 of angular rate sensor 20. First and second spring arrangements 98, 102 are oriented in mirror symmetry relative to centerline 94. Thus, first and second spring arrangements 98, 102 are laterally displaced away from centerline 100 by the same distance.

FIG. 3 particularly illustrates first spring arrangement 98. However, the ensuing description of first spring arrangement 98 applies equally to second spring arrangement 102. As best seen in FIG. 3, first spring arrangement 98 includes a first stiff beam 104 and a second stiff beam 106, each of which is oriented substantially diagonal to, i.e. slanted obliquely relative to, the sense direction, i.e., X-axis 24. The term "diagonal" used herein refers to a configuration in which each of beams 104 and 106 is not arranged parallel to the sense direction of sense masses 32, 34, and is not arranged perpendicular to the sense direction of sense masses 32, 34. Instead, beams 104, 106 may be slanted obliquely, although they are not limited to a forty-five degree slant relative to the sense direction.

First and second beams 104, 106 of first spring arrangement 98 are generally equal in length and are oriented relative to one another to form an inverted V-arrangement.

Of course, since first and second spring arrangements 98, 102 are oriented in mirror symmetry relative to one another, first and second beams 104, 106 of second spring arrangement 102 are oriented relative to one another to form an upright V-arrangement.

First spring arrangement 98 further includes a mass element 108 suspended above surface 46 of planar substrate 28. In particular, flexures 110 connect mass element 108 to surface 46 of planar substrate 28 via an anchor system 112. In the illustrated configuration, flexures 110 are relatively stiff in the sense direction substantially parallel to X-axis 24. That is, flexures 110 are thin in a direction parallel to Y-axis 26 as compared to their length parallel to X-axis 24. Thus, flexures 110 are compliant, i.e., are able to bend, flex, or otherwise deform, in a direction other than the sense direction parallel to X-axis 24.

First spring arrangement 98 further includes first side springs 114 flexibly interconnected between first stiff beam 104 and first sense element 32, and second side springs 116 flexibly interconnected between first stiff beam 104 and mass element 108. Similarly, first spring arrangement 98 includes third side springs 118 flexibly interconnected between second stiff beam 106 and second sense mass 34, and fourth side springs 120 flexibly interconnected between second stiff beam 106 and mass element 108.

Each of side springs 114, 116, 118, 120 is rotationally compliant about an axis that is substantially perpendicular to surface 46 of planar substrate 28. That is, each of side springs 114, 116, 118, 120 is formed from any suitable spring configuration that allows for rotation about Z-axis 22. However, side springs 114, 116, 118, 120 are axially stiff, i.e., are generally prevented from linear movement parallel to Z-axis 22, so that the rotational movement of side springs 114, 116, 118, 120 is constrained to the X-Y plane of angular rate sensor 20. Additionally, the spring constants of first and second stiff beams 104, 106 can be tuned to be much stiffer than that of side springs 114, 116, 118, 120 so that beams 104, 106 are largely non-compliant and side springs 114, 116, 118, 120 are more compliant than beams 104, 106. By way of example, the width of beams 104, 106 in the X-Y plane of angular rate sensor 20 may be significantly greater than the width of any of side springs 114, 116, 118, 120. Thus, beams 104, 106 along with side springs 114, 116, 118, 120 function cooperatively to enable anti-phase linear oscillatory motion of first and second sense masses 32, 34 in the sense direction substantially parallel to X-axis 24 in response to an angular stimulus about the input axis substantially parallel to Z-axis 22.

Figure 4:
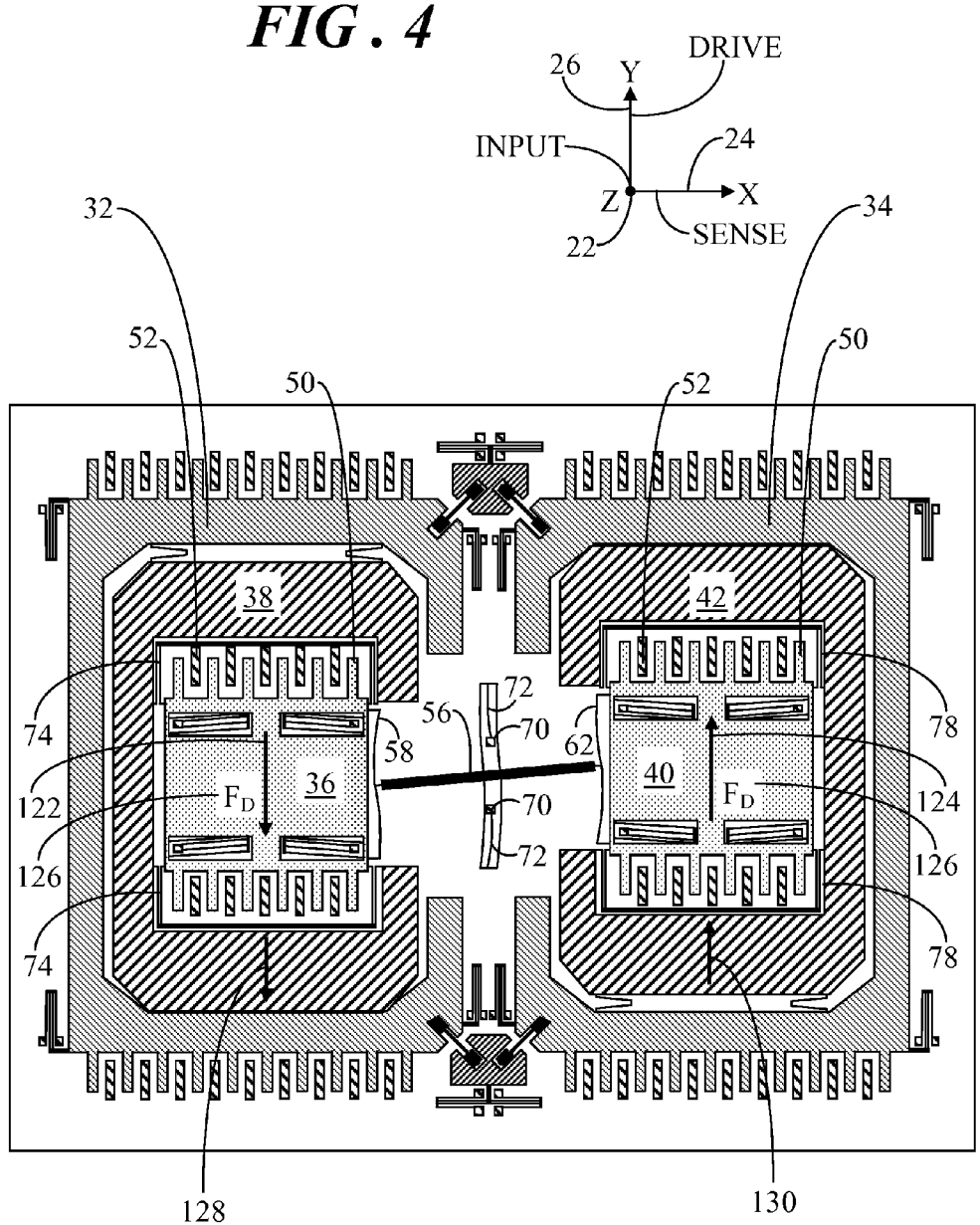
FIG. 4 shows a top view of the MEMS device of FIG. 1 exemplifying anti-phase motion of a pair of drive masses of the MEMS device.

FIG. 4 shows a top view of angular rate sensor 20 of FIG. 1 exemplifying anti-phase motion of first and second drive masses 36, 40. First and second drive masses 36, 40 are actuated via a drive signal provided by a drive circuit (not shown) to the sets of movable and fixed fingers 50, 52 so as to produce anti-phase drive motion, represented by opposing arrows 122, 124 superimposed over first and second drive masses 36, 40. This anti-phase drive motion 122, 124 is at a fundamental drive frequency 126, labeled $F_D$, dictated by the drive circuit.

It should be recalled that first and second drive masses 36, 40 are interconnected with respective first and second coupling masses 38, 42 via respective first and second link spring components 74, 78. Thus, first coupling mass 38 moves in-phase with first drive mass 36 and second coupling mass 42 moves in-phase with second drive mass 40. Accordingly, first and second coupling masses 38, 42 move in anti-phase relative to one another. This anti-phase motion is represented by opposing arrows 128, 130 superimposed over first and second coupling masses 38, 42. However, the movement of first and second drive masses 36, 40 is decoupled from first and second sense masses 32, 34. Thus, first and second sense masses 32, 34 are unresponsive to (i.e., unaffected by) anti-phase drive motion 122, 124 of first and second drive masses 36, 40. As such, the potential for quadrature error and/or other electrical noise that might otherwise impose erroneous signal input from first and second drive masses 36, 40 to first and sense masses 32, 34 is significantly reduced.

As illustrated in FIG. 4, due to the anti-phase drive motion 122, 124 of first and second drive masses 36, 40, first and second elastic elements 58, 62 and flexures 72 deform and stiff beam 56 pivots about its hinge point/constraint, and in particular, about an axis parallel to Z-axis 22 passing through the hinge point/constraint. Thus, first and second drive masses 36, 40 oscillate at drive frequency 126 in anti-phase by the same amount.

Additionally, the coupling of drive masses 36, 40 via stiff beam 56 considerably increases the stiffness of the system in the drive direction substantially parallel to Y-axis 26. With a suitably designed configuration of stiff beam 56, the stiffness of the system in the drive direction can significantly increase the magnitude of the common mode drive frequency (i.e., the frequency of an undesired vibration mode in which first and second drive masses 36, 40 could move in-phase). An increased common mode drive frequency is beneficial in terms of vibration robustness of angular rate sensor 20 primarily for two reasons. First, the energy spectral density of real world common mode excitation (e.g., vibration, shock, or other acceleration noise) tends to decrease with the increased common mode drive frequency, leading to reduced in-phase drive mass motion at the higher common mode frequency. Secondly, and by way of example, at approximately twice the common mode drive frequency relative to the drive mode frequency, approximately four times the spring stiffness has to be overcome in order to produce in-phase drive mass motion. Thus, common mode excitation (e.g., vibration, shock, or other acceleration noise) which would tend to move first and second drive masses 36, 40 by the same amount and in the same direction is effectively suppressed or rejected by the constraint of stiff beam 56 to planar substrate 28 via anchor elements 70.

Figure 5:
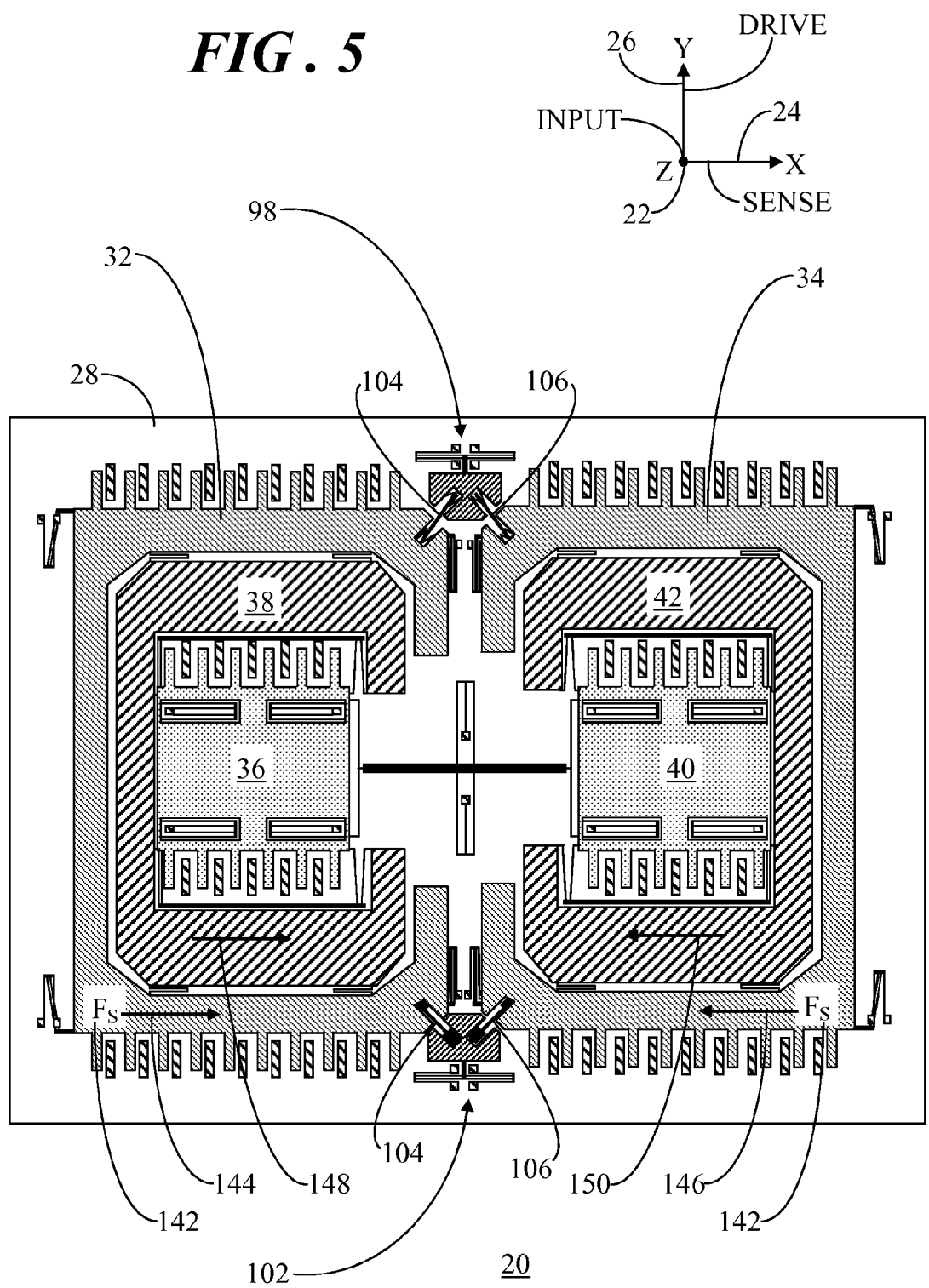
FIG. 5 shows a top view of the MEMS device of FIG. 1 exemplifying anti-phase motion of a pair of sense masses of the MEMS device.

FIG. 5 shows a top view of angular rate sensor 20 exemplifying anti-phase motion of first and second sense masses 32, 34. Once first and second drive masses 36, 40 and first and second coupling masses 38, 42 are put into anti-phase oscillatory motion in the drive direction substantially parallel to Y-axis 26 (illustrated in FIG. 4) and angular rate sensor 20 is rotated about an input axis that is substantially perpendicular to planar substrate 28, i.e., Z-axis 22, a Coriolis acceleration component enables first and second sense masses 32, 34 along with first and second coupling masses 38, 42 to oscillate substantially parallel to the sense axis, i.e., X-axis 24. This movement has an amplitude that is proportional to the angular rotation rate of angular rate sensor 20 about the input axis, i.e., Z-axis 22.

Due to the interconnection of first and second sense masses 32, 34 via first and second spring arrangements 98, 102, and the pivoting movement of first and second stiff beams 104, 106 as discussed in connection with FIG. 3, first and second sense masses 32, 34 oscillate at a fundamental sense frequency 142, labeled $F_S$, in anti-phase as represented by opposing arrows 144, 146 superimposed over first and second sense masses 32, 34. Likewise, first coupling mass 38 moves in-phase with first sense mass 32 and second coupling mass 42 moves in-phase with second sense mass 34. Accordingly, first and second coupling masses 38, 42 oscillate in anti-phase relative to one another substantially parallel to the sense axis, i.e., X-axis 24. This anti-phase motion is represented by opposing arrows 148, 150 superimposed over first and second coupling masses 38, 42. However, the movement of first and second drive masses 36, 40 is decoupled from first and second sense masses 32, 34. Thus, first and second drive masses 36, 40 are unresponsive to (i.e., unaffected by) anti-phase sense motion 144, 146 of first and second sense masses 32, 34.

FIG. 6 shows a conceptual model 152 of first and second sense masses 32, 34 for angular rate sensor 20 coupled via spring system 96 in accordance with an embodiment. In conceptual model 152, first spring arrangement 98 is represented by an element 154 and a spring 156. Likewise, second spring arrangement 102 is represented by element 154 and 156. As described above, the various side springs 114, 116, 118, 120 (best seen in FIG. 3) are stiff, i.e., non-compliant, in the sense direction substantially parallel to X-axis 24. This stiffness is represented in conceptual model 152 by element 154. However, spring 156 represents the ability of flexures 110 (best seen in FIG. 3) to move, i.e., stretch, compress, or otherwise deform, in a direction parallel to the drive direction substantially parallel to Y-axis 26.

The stiffness of beams 104, 106, as well as the stiffness of side springs 114, 116, 118, 120 in the sense direction (parallel to X-axis 24), provide mechanical constraint to in-phase sense motion, represented by the two commonly directed arrows 158, 160 at the resonant operating frequency, i.e., fundamental sense frequency 142 (FIG. 5). Thus, in-phase motion 158, 160 of first and second sense masses 32, 34 due to external vibration, shock, spurious acceleration, or interference at fundamental sense frequency 142 is largely prevented. The mechanical constraint of spring system 96 can push an in-phase frequency component, referred to herein as a common mode sense frequency 162 and labeled $F_{CM-S}$, due to in-phase motion 158, 160 sufficiently high so that common mode sense frequency 162 is outside of the operating range of angular rate sensor 20 (FIG. 1), thereby effectively suppressing or rejecting common mode excitation in the sense direction parallel to X-axis 24.

Referring to FIGS. 7 and 8, FIG. 7 shows conceptual model 152 demonstrating anti-phase motion 144, 146 of first and second sense masses 32, 34 in a first direction 164, and FIG. 8 shows conceptual model 152 demonstrating anti-phase sense motion 144, 146 of first and second sense masses 32, 34 in a second direction 166. Sense masses 32, 34 oscillate in anti-phase in response to an angular stimulus about an axis, i.e., Z-axis 22, that is substantially perpendicular to planar substrate 28 (FIG. 1), as discussed extensively above.

In FIG. 7, anti-phase sense motion 144, 146 moves first and second sense masses 32, 34 in first direction 164 toward one another. As first and second sense masses 32, 34 move toward one another, side springs 114, 116, 118, 120 (FIG. 3) enable rotational movement of stiff beams 104, 106, as represented by arrows 168, so that stiff beams 104, 106 in each of first and second spring arrangements 98, 102 pivot toward one another in the sense direction. In FIG. 8, anti-phase sense motion 144, 146 moves first and second sense masses 32, 34 in second direction 166 away from one another. As first and second sense masses 32, 34 move away from one another, side springs 114, 116, 118, 120 (FIG. 3) enable rotational movement 168 of stiff beams 104, 106 so that stiff beams 104, 106 in each of first and second spring arrangements 98, 102 pivot away from one another in the sense direction.

Thus, oscillatory anti-phase sense motion 144, 146 of first and second sense masses 32, 34 is enabled, while in-phase sense motion 158, 160 is substantially prevented. That is, stiff beams 104, 106 of each of spring arrangements 98, 102 is constrained to a non-collapsed (non-pivoting) configuration 170 as shown in FIG. 6 when subjected to common mode excitation (e.g., an external shock, vibration, or other acceleration) due to the non-compliance of side springs 114, 116, 118, 120 (FIG. 3) in the sense direction substantially parallel to X-axis 24.

Embodiments of the present invention entail a MEMS device, such as an angular rate sensor, having a common mode rejection structure and fully decoupled drive and sense modes. An embodiment of a MEMS device includes a planar substrate and a drive assembly anchored to the planar substrate, the drive assembly including a first drive mass and a second drive mass. A stiff beam interconnects the first drive mass with the second drive mass. A lengthwise dimension of the stiff beam is oriented perpendicular to a drive direction of the first and second drive masses, the drive direction being substantially parallel to the planar substrate, wherein the stiff beam pivots about an axis that is substantially perpendicular to the planar substrate in response to drive motion of the first and second drive masses in the drive direction.

The drive spring system, which includes the stiff beam interconnecting the first and second drive masses enables a fundamental anti-phase drive motion of the drive masses while increasing the common mode drive frequency so that in-phase motion of the drive masses is effectively rejected. The sense spring system coupling the first and second sense masses enables a fundamental anti-phase sense motion of the sense masses while increasing the common mode sense frequency so that in-phase motion of the sense masses is also effectively rejected. The coupling masses interposed between the drive and sense masses decouple the drive motion of the drive masses from the sense motion of the sense masses. The common mode rejection structures of the MEMS device enable suppression of both of the drive and sense in-phase motion individually, and the fully decoupled configuration reduces the potential for quadrature error and/or other electrical noise that might otherwise impose erroneous signal input from the drive masses to the sense masses.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A microelectromechanical systems (MEMS) device comprising:
   a planar substrate;
   a drive assembly anchored to said planar substrate, said drive assembly including a first drive mass and a second drive mass; and
   a stiff beam interconnecting said first drive mass with said second drive mass, a lengthwise dimension of said stiff beam being oriented perpendicular to a drive direction of said first and second drive masses, said drive direction being substantially parallel to said planar substrate, wherein said stiff beam pivots about an axis that is substantially perpendicular to said planar substrate in response to drive motion of said first and second drive masses in said drive direction.

2. The MEMS device of claim 1 further comprising:
   a first elastic element coupled between a first end of said stiff beam and said first drive mass; and
   a second elastic element coupled between a second end of said stiff beam and said second drive mass, said first and second elastic elements being oriented transverse to said stiff beam.

3. The MEMS device of claim 2 wherein said stiff beam and said first and second elastic elements are configured to enable said first and second drive masses to move in phase opposition with one another.

4. The MEMS device of claim 1 wherein a central region of said stiff beam is elastically coupled to said planar substrate via at least one anchor element and at least one flexure interconnected between said central region of said stiff beam and said at least one anchor element, said at least one flexure being oriented transverse to said stiff beam.

5. The MEMS device of claim 1 further comprising:
   a first sense mass;
   a second sense mass;
   a first elastic component flexibly coupling said first sense mass with said first drive mass of said drive assembly; and
   a second elastic component flexibly coupling said second sense mass with said second drive mass of said drive assembly, wherein said first and second sense masses are configured for movement in a sense direction that is substantially parallel to said planar substrate and substantially perpendicular to said drive direction in response to an angular stimulus about said axis that is substantially perpendicular to said planar substrate.

6. The MEMS device of claim 1 further comprising:
   a first sense mass flexibly coupled with said drive assembly;
   a second sense mass flexibly coupled with said drive assembly, said first and second sense masses being constrained to move in a sense direction that is substantially parallel to said planar substrate and substantially perpendicular to said drive direction; and
   a spring system configured to reduce in-phase motion of said first and second sense masses, said spring system including:
      a first spring arrangement coupled to each of said first and second sense masses at a first location laterally displaced away from a centerline of said MEMS device, said centerline being oriented substantially parallel to said sense direction; and
      a second spring arrangement coupled to each of said first and second sense masses at a second location laterally displaced away from said centerline, wherein said first and second spring arrangements are oriented in mirror symmetry relative to said centerline.

7. The MEMS device of claim 6 wherein each of said first and second spring arrangements comprises:
   a first stiff beam;
   a second stiff beam, wherein said first and second stiff beams are oriented diagonal to said sense direction;
   a first side spring flexibly interconnected between said first stiff beam and said first sense mass; and
   a second side spring flexibly interconnected between said second stiff beam and said second sense mass.

8. The MEMS device of claim 7 wherein said each of said first and second spring arrangements further comprises:
   a mass component suspended above said planar substrate;
   a third side spring flexibly interconnected between said first stiff beam and said mass component; and
   a fourth side spring flexibly interconnected between said second stiff beam and said mass component, wherein each of said first, second, third, and fourth side springs is rotationally compliant about said axis that is substantially perpendicular to said planar substrate.

9. The MEMS device of claim 8 wherein said first, second, third, and fourth side springs are configured to function cooperatively to enable pivotal movement of said first and second stiff beams in response to anti-phase sense motion of said first and second sense masses.

10. The MEMS device of claim 1 further comprising:
    a first sense mass and a second sense mass flexibly coupled with said drive assembly, said first and second sense masses being constrained to move in a sense direction that is substantially parallel to said planar substrate and substantially perpendicular to said drive direction; and
    said drive assembly further comprises:
       a first coupling mass interposed between said first drive mass and said first sense mass and a first elastic component interconnected between said first sense mass and said first coupling mass to couple said first sense mass with said first drive mass, wherein said first coupling mass is configured to move in-phase with said first drive mass in said drive direction; and
       a second coupling mass interposed between said second drive mass and said second sense mass and a second elastic component interconnected between said second sense mass and said second coupling mass to couple said second sense mass with said second drive mass, wherein said second coupling mass is configured to move in-phase with said second drive mass in said drive direction.

11. The MEMS device of claim 10 wherein:
    said first coupling mass is further configured to move in-phase with said first sense mass; and
    said second coupling mass is further configured to move in-phase with said second sense mass.

12. A microelectromechanical systems (MEMS) device comprising:
    a planar substrate;
    a drive assembly anchored to said planar substrate, said drive assembly including a first drive mass and a second drive mass;
    a stiff beam interconnecting said first drive mass with said second drive mass, a lengthwise dimension of said stiff beam being oriented perpendicular to a drive direction of said first and second drive masses, said drive direction being substantially parallel to said planar substrate, wherein a central region of said stiff beam is elastically coupled to said planar substrate via at least one anchor element and at least one flexure interconnected between said central region of said stiff beam and said at least one anchor element, said at least one flexure being oriented transverse to said stiff beam, and said stiff beam pivots about an axis that is substantially perpendicular to said planar substrate in response to drive motion of said first and second drive masses in said drive direction;
a first sense mass;
a second sense mass;
a first elastic arrangement flexibly coupling said first sense mass with said first drive mass of said drive assembly; and
a second elastic arrangement flexibly coupling said second sense mass with said second drive mass of said drive assembly, wherein said first and second sense masses are configured for movement in a sense direction that is substantially parallel to said planar substrate and substantially perpendicular to said drive direction in response to an angular stimulus about said axis that is substantially perpendicular to said planar substrate.

13. The MEMS device of claim 12 further comprising a spring system configured to reduce in-phase motion of said first and second sense masses, said spring system including:
a first spring arrangement coupled to each of said first and second sense masses at a first location laterally displaced away from a centerline of said MEMS device, said centerline being oriented substantially parallel to said sense direction; and
a second spring arrangement coupled to each of said first and second sense masses at a second location laterally displaced away from said centerline, wherein said first and second spring arrangements are oriented in mirror symmetry relative to said centerline.

14. The MEMS device of claim 13 wherein each of said first and second spring arrangements comprises:
a first stiff beam;
a second stiff beam, said first and second stiff beams being oriented diagonal to said sense direction;
a first side spring flexibly interconnected between said first stiff beam and said first sense mass; and
a second side spring flexibly interconnected between said second stiff beam and said second sense mass.

15. The MEMS device of claim 14 wherein said each of said first and second spring arrangements further comprises:
a mass component suspended above said planar substrate;
a third side spring flexibly interconnected between said first stiff beam and said mass component; and
a fourth side spring flexibly interconnected between said second stiff beam and said mass component, wherein each of said first, second, third, and fourth side springs is rotationally compliant about said axis that is substantially perpendicular to said planar substrate.

16. The MEMS device of claim 12 wherein said drive assembly further comprises:
a first coupling mass interposed between said first drive mass and said first sense mass, said first coupling mass being configured to move in-phase with said first drive mass in said drive direction, wherein said first elastic arrangement is interconnected between said first sense mass and said first coupling mass to couple said first sense mass with said first drive mass; and
a second coupling mass interposed between said second drive mass and said second sense mass, said second coupling mass being configured to move in-phase with said second drive mass in said drive direction, wherein said second elastic arrangement is interconnected between said second sense mass and said second coupling mass to couple said second sense mass with said second drive mass.

17. The MEMS device of claim 16 wherein:
said first coupling mass is further configured to move in-phase with said first sense mass; and
said second coupling mass is further configured to move in-phase with said second sense mass.

18. A microelectromechanical systems (MEMS) device comprising:
a planar substrate;
a drive assembly anchored to said planar substrate, said drive assembly including a first drive mass and a second drive mass;
a stiff beam having a lengthwise dimension oriented perpendicular to a drive direction of said first and second drive masses, said drive direction being substantially parallel to said planar substrate,
a first elastic element coupled between a first end of said stiff beam and said first drive mass; and
a second elastic element coupled between a second end of said stiff beam and said second drive mass, said first and second elastic elements being oriented transverse to said stiff beam, wherein a central region of said stiff beam is elastically coupled to said planar substrate via at least one anchor element and at least one flexure interconnected between said central region of said stiff beam and said at least one anchor element, said at least one flexure being oriented transverse to said stiff beam, and said stiff beam pivots about an axis that is substantially perpendicular to said planar substrate in response to drive motion of said first and second drive masses in said drive direction.

19. The MEMS device of claim 18 further comprising:
a first sense mass;
a second sense mass;
a first elastic arrangement coupling said first sense mass with said first drive mass of said drive assembly; and
a second elastic arrangement coupling said second sense mass with said second drive mass of said drive assembly, wherein said first and second sense masses are configured for movement in a sense direction that is substantially parallel to said planar substrate and substantially perpendicular to said drive direction in response to an angular stimulus about said axis that is substantially perpendicular to said planar substrate.

20. The MEMS device of claim 19 wherein said drive assembly further comprises:
a first coupling mass interposed between said first drive mass and said first sense mass, said first elastic arrangement being interconnected between said first sense mass and said first coupling mass to couple said first sense mass with said first drive mass, wherein said first coupling mass is configured to move in-phase with said first drive mass in said drive direction, and said first coupling mass is further configured to move in-phase with said first sense mass in response to said angular stimulus about said axis that is substantially perpendicular to said planar substrate; and
a second coupling mass interposed between said second drive mass and said second sense mass, said second elastic arrangement being interconnected between said second sense mass and said second coupling mass to couple said second sense mass with said second drive mass, wherein said second coupling mass is configured to move in-phase with said second drive mass in said drive direction, and said second coupling mass is further configured to move in-phase with said second sense mass in response to said angular stimulus.

* * * * *